(12) United States Patent
Kratky et al.

(10) Patent No.: US 6,777,391 B1
(45) Date of Patent: Aug. 17, 2004

(54) COMPOSITION FOR AN INFANT FORMULA HAVING A LOW THREONINE CONTENT

(75) Inventors: Zdenek Kratky, Maracon (CH); Jean-Claude Maire, Belmont S/Lausanne (CH); Olivier Ballevre, Lausanne (CH); Ferdinand Haschke, Lausanne (CH); Rolf Jost, Bolligen (CH); Martinas Kuslys, Grosshoechstetten (CH); Niklaus Meister, Grosshoechstetten (CH); Marie-Christine Secretin, Blonay (CH)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 10/019,848

(22) PCT Filed: May 2, 2000

(86) PCT No.: PCT/EP00/03887

§ 371 (c)(1),
(2), (4) Date: Apr. 22, 2002

(87) PCT Pub. No.: WO01/11990

PCT Pub. Date: Feb. 22, 2001

(30) Foreign Application Priority Data

Apr. 29, 1999 (EP) .............................................. 99108405
Sep. 29, 1999 (GB) .............................................. 9923048

(51) Int. Cl.⁷ ........................ A01N 43/04; A61K 31/70; A23C 15/00; A23L 1/10
(52) U.S. Cl. ........................... 514/23; 514/53; 426/580; 426/583; 426/801; 562/444; 562/560; 548/344; 548/496

(58) Field of Search .............................. 514/557, 23, 53; 426/580, 583, 801; 562/560, 444; 548/344, 496

(56) References Cited

U.S. PATENT DOCUMENTS 4,303,692 A * 12/1981 Gaull et al.
5,405,637 A * 4/1995 Martinez et al.

FOREIGN PATENT DOCUMENTS

| EP | 0 312 612 | 4/1989 |
| EP | 0 418 593 A2 | 3/1991 |
| EP | 418 593 A2 * | 3/1991 |
| EP | 0 705 542 A1 | 4/1996 |
| EP | 0 747 395 A1 | 12/1996 |
| EP | 0 880 902 A1 | 12/1998 |

* cited by examiner

Primary Examiner—James O. Wilson
Assistant Examiner—Traviss C. McIntosh, III
(74) Attorney, Agent, or Firm—Bell, Boyd & Lloyd LLC

(57) ABSTRACT

A composition for an infant formula which comprises a low threonine content; a method of producing the composition; use of the composition in the manufacture of a medicament or nutritional product for addressing the nutritional needs and providing healthy growth of an infant; and a method of addressing the nutritional needs and providing healthy growth of an infant which comprises administering an effective amount of the composition. A preferred embodiment of the composition comprises all of: i) acid whey protein or sweet whey protein from which caseino-glycomacropeptide has been removed; and ii) free arginine; and iii) free histidine; and iv) free tyrosine or free tryptophan or tryptophan rich milk protein or a mixture thereof.

35 Claims, No Drawings

COMPOSITION FOR AN INFANT FORMULA HAVING A LOW THREONINE CONTENT

This invention relates to a composition for an infant formula having a low threonine content; a method of producing the composition; use of the composition in the manufacture of a medicament or nutritional product for addressing the nutritional needs and providing healthy growth of an infant; and a method of addressing the nutritional needs and providing healthy growth of an infant which comprises administering an effective amount of the composition.

Within the context of this application the word "comprises" is taken to mean "includes, among other things" and it is not intended to mean "consists of only".

Mother's milk is recommended for all infants. However, in some cases mother's milk is not available and infant formulae must be used. Normal, full-term infants are usually fed cow's-milk-based formulas. These formulas contain a mixture of casein and whey as protein sources and they provide nutrition for infants, however they do not provide a protein concentration and an amino acid profile equivalent to that of mother's milk. In addition these standard formulae are not suitable for pre-term infants and those having adverse reactions to protein in cow's milk formula or to lactose.

An alternatives to cow's milk formula is soy formula; particularly for infants who are lactose intolerant. However, soy is not as good a protein source as cow's milk. Also, infants do not absorb some minerals, such as calcium, as efficiently from soy formulae.

A further alternative formula is based on hydrolysed protein. These formulas are hypoallergenic and have a decreased likelihood of an allergic reaction.

Ideally, to be as close as possible to human milk, the protein in infant formulae may be derived from both whey and casein in an appropriate ratio. However, a problem with conventional formulae having these proteins is that they have a high protein concentration to ensure that the infant gets the necessary amount of all essential amino acids. The protein concentration is higher than the concentration normally found in human milk and it may not be beneficial for an infant because an infant's metabolism is susceptible to overloading with nitrogen from its protein intake.

To address this problem, formulae having improved amino acid profiles have been suggested, for example those having hydrolysed whey proteins. However, until now there has not been a composition having a protein concentration equivalent to the concentration in human milk and a good amino acid profile.

The present invention addresses the problems set out above.

Accordingly, the invention provides a composition for an infant formula having a low threonine content which comprises all of:
  i) acid whey protein or sweet whey protein from which caseino-glyco-macropeptide has been removed; and
  ii) free arginine; and
  iii) free histidine; and
  iv) free tyrosine or tryptophan rich milk protein or free tryptophan or a mixture thereof.

In a second aspect the invention provides a method of producing the composition which comprises the step of blending whey protein together with free arginine; free histidine; and free tyrosine or tryptophan rich milk protein, free tryptophan or a mixture thereof and homogenising the blended mixture.

In a third aspect the invention provides use of an embodiment of the composition in the manufacture of a medicament or nutritional product for addressing the nutritional needs and providing healthy growth of an infant.

In a forth aspect the invention provides a method of addressing the nutritional needs and providing healthy growth of an infant which comprises administering an effective amount of an embodiment of the composition.

Preferably the protein source has a threonine content of less than about 8 g/16 gN, more preferably it is less than about 6 g/16 gN.

Preferably an embodiment of the composition comprises from about 9.0 to about 10.0 w/w % of protein, more preferably about 9.5% w/w %. This corresponds to about 1.8 g protein/100 kcal. This provides the advantage of a lower protein concentration relative to known formulae. An advantage provided by this concentration of protein is that it is equivalent to the amount of protein generally present in human milk and it corresponds to the lower limit tolerated by codex alimentarius.

Preferably an embodiment of the composition comprises about 6% to about 50% by weight of whey protein, more preferably about 20% to 40% whey protein, most preferably 30% whey protein.

Preferably the composition also comprises casein protein. An advantage provided by casein is that it has the ability to form curd which enhances the feeling of satiety. Preferably it comprises from about 20% to about 40% casein protein, more preferably about 30%. Preferably, the ratio of whey protein to casein protein is about 60%:about 40% to about 70%:about 30%, most preferably it is about 70%:about 30%.

Preferably the whey protein is acid whey protein or sweet whey protein. In general, acid whey protein is preferred from a nutritional point of view since it has a lower threonine content and this is closer to that of human milk.

Preferably, the sweet whey protein is sweet whey protein from which caseino-glyo-macropeptide has been removed. This provides the advantage of a reduced threonine content and an increased tryptophan content as compared to normal sweet whey and is therefore suitable as a protein source for infants.

Preferably, the whey protein is substantially free of lactose. This has the advantage that the infant formula has reduced levels of lysine blockage. Preferably, the level of lysine blockage is less than 10%.

Preferably an embodiment of the composition comprises protein which is non-hydrolysed. In alternative embodiments it is hydrolysed.

Preferably an embodiment of the composition comprises up to about 4% by weight of arginine; up to about 4% tyrosine or tryptophan; up to about 4% histidine. More preferably an embodiment of the composition comprises about 0.1% to about 3% by weight of arginine; about 0.2% to about 1% tyrosine or tryptophan; about 0.1% to about 2% histidine. More preferably an embodiment of the composition comprises about 0.1% to about 2% by weight of arginine; about 0.2% to about 0.5% tyrosine or tryptophan; about 0.1% to about 1.5% histidine. Suprisingly, it has been found that by supplementing with the free amino acids arginine, tyrosine, and histidine, the protein source has an amino acid profile which is close to that of human milk. This provides the advantage of mimicking the nutritional benefits of natural human milk for addressing the nutritional needs and providing healthy growth of an infant.

Preferably the concentration of tryptophan in the composition is at least about 135 mg/g and the concentration of threonine in the composition is less than about 350 mg/g.

Preferably the threonine concentration corresponds to about 4.9 g per 100 g protein to about 5.1 g per 100 g protein Preferably, tryptophan rich milk protein has a level of about 5% or more of amino acids as tryptophan. More preferably it is about 10% or more.

Preferably the free amino acids are in free base form.

Preferably an embodiment of the composition comprises a lipid source, a carbohydrate source, and a protein source. This provides the advantage that the composition is as close as possible in content to mothers milk.

The lipid source may contain medium chain triglycerides.

The carbohydrate source may include lactose. The lactose may be the sole source of carbohydrates.

In one embodiment the composition is suitable for a pre-term infant formula and comprises up to about 0.1% by weight histidine, about 0.1% to about 0.3% by weight arginine, and about 0.3 to about 0.5% by weight tryptophan.

In an alternative embodiment the composition is suitable for a full-term, hypoallergenic infant formula in which the protein source preferably comprises about 0.2% to about 0.4% by weight histidine, about 1% to about 2% by weight arginine, and about 0.2% to about 0.4% by weight tryptophan.

In an embodiment which comprises hydrolysed protein, the protein source preferably comprises about 98.5% to about 97% by weight of hydrolysed sweet whey and about 1.5% to about 3% by weight of arginine, tyrosine, and histidine.

An embodiment which comprises hydrolysed protein may be suitable for a pre-term infant formula in which the protein source comprises about 1% to about 1.5% by weight histidine, about 0.6% to about 0.9% by weight arginine, and about 0.3% to about 0.5% by weight tyrosine. In this case, the lipid source may include medium chain triglycerides.

An alternative embodiment which comprises hydrolysed protein may be suitable for a full-term, hypoallergenic infant formula in which the protein source comprises about 0.2% to about 0.4% by weight histidine, about 1% to about 2% by weight arginine, and about 0.2% to about 0.4% by weight tyrosine. The carbohydrate source may include lactose which may be the sole source of carbohydrates.

In an embodiment the invention provides a pre-term infant formula which comprises a lipid source which includes medium chain triglycerides, a carbohydrate source, and a protein source which contains a hydrolysed or non-hydrolysed sweet whey fraction having a level of lysine blockage less than 10%, the protein source having a threonine content of less than about 6 g/16 gN.

In a further embodiment, the invention provides a full-term, hypoallergenic infant formula which comprises a lipid source, a carbohydrate source which includes lactose, and a protein source which contains a hydrolysed or non-hydrolysed sweet whey fraction having a level of lysine blockage less than 10%, the protein source having a threonine content of less than about 6 g/16 gN.

Embodiments of the invention are now described by way of example.

The invention provides a composition for an infant formula which comprises arginine, tryptophan or tyrosine, histidine and a sweet whey fraction from which caseino-glyco-macropeptide has been removed. The infant formula may be used for pre-term or full-term infants.

An embodiment having hydrolysed protein may be used for pre-term infants or infants susceptible to allergic reactions.

The sweet whey used in the protein source may be obtained from cheese making, particularly the sweet whey obtained after the coagulation of casein by rennet. The sweet whey may then be processed as desired. For example, the sweet whey may be treated to remove minerals (cations, anions), lactose, or any of these substances. The sweet whey may be concentrated as desired. Suitable sweet whey sources are commercially available. It is particularly preferred that the sweet whey is substantially lactose-free.

The sweet whey is then treated to remove caseino-glyco-macropeptide. This may be accomplished by any suitable process. One suitable process is described in European patent application 0880902, the disclosure of which is incorporated by reference. In this process, the pH of the sweet whey is adjusted to 1 to 4.3, if necessary. The sweet whey is then contacted with a weakly anionic resin which is predominantly alkaline until the pH of the sweet whey stabilises at about 4.5 to 5.5. The sweet whey fraction from which the caseino-glyco-macropeptide has been removed, is then collected.

In an embodiment of the composition the whey protein is non-hydrolysed. In an alternative embodiment, the sweet whey fraction is hydrolysed to prevent allergic reactions in infants at risk and to make the protein easier to digest. The hydrolysis process may be carried out as desired and as is known in the art. In general, the whey protein hydrolysate is prepared by enzymatically hydrolysing the sweet whey fraction in one or more steps. For example, for an extensively hydrolysed protein, the sweet whey proteins may be subjected to triple hydrolysis using, for example, Alcalase 2.4 L (EC 940459), then Neutrase 0.5 L (obtainable from Novo Nordisk Ferment AG) and then pancreatin at 55° C. Alternatively, for a less hydrolysed protein, the sweet whey may be subjected to double hydrolysis using, for example, NOVOZYMES and then pancreatin.

If the sweet whey fraction used is substantially lactose free, it is found that the protein is subjected to much less lysine blockage during the hydrolysis process. This enables the extent of lysine blockage to be reduced from about 15% by weight of total lysine to less than about 10% by weight of lysine; for example about 7% by weight of lysine. This greatly improves the nutritional quality of the protein source.

The free amino acids L-arginine, L-tryptophan or L-tyrosine, and L-histidine are included in the protein source. Preferably, they are in the form of free amino acids and make up about 0.2% to about 3% by weight of the protein source. For example, the free amino acids may make up about 2% to about 2.6% by weight of the protein source.

In particular, for pre-term formulas, histidine preferably provides about 1% to about 1.5% by weight, arginine preferably provides about 0.6% to about 0.9% by weight, and tryptophan or tyrosine preferably provides about 0.3% to about 0.5% by weight, of the protein source. For hypoallergenic formulas, histidine preferably provides about 0.2% to about 0.4% by weight, arginine preferably provides about 1% to about 2% by weight, and tryptophan or tyrosine preferably provides about 0.2% to about 0.4% by weight, of the protein source.

The protein source may include other free amino acids as desired.

The carbohydrate source in the infant formula can be carbohydrate suitable for use in infant formulas. Preferred carbohydrate sources are selected from the group which comprises sucrose, maltodextrin, maltose, lactose, corn syrup, corn syrup solids, rice syrup solids, rice starch, and the like. Preferably, the carbohydrate source includes lactose and maltodextrin. The lactose is preferably free of any allergens. For full term formulas, the carbohydrate source is preferably lactose.

The lipid source may be any lipid or fat which is suitable for use in infant formulas. Preferred lipid sources include milk fat, safflower oil, egg yolk lipid, canola oil, olive oil, coconut oil, palm oil, palm kernel oil, palm olein, soybean oil, sunflower oil, fish oil, and microbial fermentation oil containing long-chain, polyunsaturated fatty acids. These oils may be in the form of high oleic forms such as high oleic sunflower oil and high oleic safflower oil. The lipid source may also be in the form of fractions derived from these oils such as palm olein, medium chain triglycerides (MCT), and esters of fatty acids such as arachidonic acid, linoleic acid, palmitic acid, stearic acid, docosahexaeonic acid, linolenic acid, oleic acid, lauric acid, capric acid, caprylic acid, caproic acid, and the like.

For pre-term formulas, the lipid source preferably contains medium chain triglycerides; for example in an amount of about 15% to about 35% by weight of the lipid source.

The lipid source preferably has a ratio of n-6 to n-3 fatty acids of about 5:1 to about 15:1; for example about 8:1 to about 10:1.

The infant formula may further comprise ingredients which are designed to meet the nutritional needs of a human infant. In particular, it is preferred that the infant formula is "nutritionally complete"; that is it contains adequate nutrients to sustain healthy human life for extended periods.

The amount of protein per 100 kcal of formula is typically about 1.8 g to about 4.5 g; for example about 1.8 g to about 4 g. For full term hypoallergenic formulas, the amount may be about 1.8 g/100 kcal to about 2.5 g/100 kcal. In order to reduce protein loading, the amount is preferably less than about 2 g/100 kcal. For pre-term formulas, the amount maybe about 1.8 g/100 kcal to about 4 g/100 kcal.

The amount of lipid source per 100 kcal of formula may be about 3.3 g to about 6.5 g; for example about 4.4 g to about 6.5 g. The amount of carbohydrate source per 100 kcal of total formula is typically about 7 g to about 14 g.

When in nutritionally complete form, the infant formula contains all vitamins and minerals understood to be essential in the daily diet and in nutritionally significant amounts. Minimum requirements have been established for certain vitamins and minerals. Examples of minerals, vitamins and other nutrients optionally present in the infant formula include vitamin A, vitamin $B_1$, vitamin $B_2$, vitamin $B_6$, vitamin $B_{12}$, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form. The presence and amounts of specific minerals and other vitamins will vary depending on the intended infant population.

If necessary, the infant formula may contain emulsifiers and stabilisers such as soy lecithin, citric acid esters of mono- and di-glycerides, and the like. This is especially the case if the formula is provided in liquid form.

The infant formula may optionally contain other substances which may have a beneficial effect such as fibres, lactoferrin, nucleotides, nucleosides, and the like.

The infant formula may be prepared in any suitable manner. For example, for an infant formula may be prepared by blending together the protein source, the carbohydrate source, and the fat source in appropriate proportions. If used, the emulsifiers may be included in the blend. The vitamins and minerals may be added at this point but are usually added later to avoid thermal degradation. Any lipophilic vitamins, emulsifiers and the like may be dissolved into the fat source prior to blending. Water, preferably water which has been subjected to reverse osmosis, may then be mixed in to form a liquid mixture.

The liquid mixture may then be thermally treated to reduce bacterial loads. For example, the liquid mixture may be rapidly heated to a temperature in the range of about 80° C. to about 110° C. for about 5 seconds to about 5 minutes. This may be carried out by steam injection or by heat exchanger, for example a plate heat exchanger.

The liquid mixture may then be cooled to about 60° C. to about 85° C.; for example by flash cooling. The liquid mixture may then be homogenised; for example in two stages at about 7 MPa to about 40 MPa in the first stage and about 2 MPa to about 14 MPa in the second stage. The homogenised mixture may then be further cooled to add any heat sensitive components; such as vitamins and minerals. The pH and solids content of the homogenised mixture is conveniently standardised at this point.

If it is desired to produce a powdered infant formula, the homogenised mixture is transferred to a suitable drying apparatus such as a spray drier or freeze drier and converted to powder. The powder should have a moisture content of less than about 5% by weight.

If it is desired to produce a liquid infant formula, the homogenised mixture is filled into suitable containers; preferably aseptically. However, the liquid infant formula may also be retorted in the container. Suitable apparatus for carrying out filling of this nature is commercially available. The liquid infant formula may be in the form of a ready to feed formula having a solids content of about 10 to about 14% by weight or may be in the form of a concentrate; usually of solids content of about 20 to about 26% by weight Specific examples of the invention are now described for illustration.

EXAMPLE 1 a) A sweet whey protein concentrate is dissolved in deionised water and the pH is adjusted to 4.25 by contacting the solution with a cation exchange resin (IMAC HP 1100 E, Rohm and Haas). The solution is treated with a weakly anionic resin (IMAC HP 661, Rohm & Haas, which has been regenerated in $OH^-$ form) for about 6 hours at 8° C. Once the pH reaches about 5.25 and does not change, the solution is recovered. Over 85% of the caseino-glyco-macropeptide originally present has been removed from the solution b) The solution of step a) is standardised in demineralised water at 55° C. The solution is then heated to 75° C. for 20 seconds. The pH of the solution is adjusted to 7.5 by the addition of $Ca(OH)_2$ and a solution of NaOH and KOH.

The reaction mixture is then subjected to microfiltration and ultrafiltration and then dried by lyophilisation and packaged into metal cans. The protein has low levels of lysine blockage with 6.9% blocked lysine and 9% reactive lysine.

c) The protein of step b) is combined with 0.72% by weight L-arginine, 0.44% by weight of L-tryptophan, and 1.38% by weight of L-histidine. The mixture is formulated into a powdered infant formula. The infant formula has the following composition:

| Component | Amount |
|---|---|
| Milk SNF | 8–10% |
| Whey protein | 6–50% |
| Alpha-lactalbumin rich whey protein source | 0–2% |
| Arginine | 0.1–0.3% |
| Histidine | 0–0.1% |
| Fat | 25–30% |
| Lactose | 10–40% |
| Vitamins and minerals | To meet regulations |

The composition has a protein concentration of 9.5 w/w % or 1.8 g protein/100 kcal.

EXAMPLE 2

Step a) is carried out as in Example 1.

b) The solution of step a) is standardised in demineralised water at 55° C. The solution is then heated to 75° C. for 20 seconds. The pH of the solution is adjusted to 7.5 by the addition of Ca(OH)$_2$ and a solution of NaOH and KOH. The protein is then hydrolysed using the NOVOZYME enzyme (obtainable from Novo Nordisk Ferment AG). The hydrolysis reaction is continued for 4 hours at 55° C.

An amount of pancreatin is added and the protein is further hydrolysed for 8 hours at 55° C. and at a pH of 7.0. The enzymes are then inactivated by heating the reaction mixture to 90° C. and holding the mixture at this temperature for about 5 minutes. The reaction mixture is then cooled to 5° C.

The reaction mixture is then subjected to microfiltration and ultrafiltration. The hydrolysed protein is then dried by lyophilisation and packaged into metal cans. The hydrolysed protein has low levels of lysine blockage with 6.9% blocked lysine and 9% reactive lysine.

c) The hydrolysed protein of step b) is combined with 0.72% by weight L-arginine, 0.44% by weight of L-tyrosine, and 1.38% by weight of L-histidine. The mixture is formulated into a powdered infant formula. The infant formula has the following composition:

| Component | Amount per 100 kcal |
|---|---|
| Protein | 3.6 g |
| Hydrolysed whey | 3.5 g |
| Free amino acids | 0.1 g |
| Lipids | 5.2 g |
| Medium chain triglycerides | |
| High oleic sunflower oil | |
| Soya bean oil | |
| Palm olein | |
| Fish oil | |
| Egg phospholipids | |
| Carbohydrates | 9.9 g |
| Lactose | 2.0 g |
| Maltodextrin | 7.9 g |
| Vitamins and minerals | To meet regulations |

The infant formula is suitable for pre-term infants and has the following amino acid profile:

| Amino Acids | gAA/16gN |
|---|---|
| Aspartic Acid | 11.64 |
| Threonine | 5.69 |
| Serine | 4.79 |
| Glutamic Acid | 16.69 |
| Proline | 4.90 |
| Glycine | 2.16 |
| Alanine | 5.37 |
| Cystine | 2.69 |
| Valine | 5.37 |
| Methionine | 2.26 |
| Isoleucine | 5.32 |
| Leucine | 12.53 |
| Tyrosine | 3.42 |
| Phenylalanine | 3.95 |
| Lysine | 9.58 |
| Histidine | 3.37 |
| Arginine | 3.42 |
| Tryptophan | 2.16 |

EXAMPLE 3 a) The solution of step a) of example 1 is standardised in demineralised water at 55° C. The pH is increased from 6.6 to 7.9 by addition of a 20% (weight/volume) aqueous dispersion of Ca(OH)$_2$. The pH is then regulated at 7.3 by compensation with a 2N aqueous solution of KOH.

Pancreatic trypsin is added to initiate hydrolysis and the reaction is continued for 4 hours at 50° C. The hydrolysate is then heated to 90° C. by injection of steam and is kept at this temperature for 5 minutes. After cooling to 55° C., the pH is readjusted to 7.3 by automatic compensation with a 2N aqueous solution of KOH. Porcine trypsin is then introduced to initiate second hydrolysis which is continued for 2 hours with automatic compensation of the pH. The hydrolysate is then heat-treated for 10 minutes at 90° C., rapidly cooled and then dried by freeze-drying.

The hydrolysed protein has low levels of lysine blockage. The hydrolysed protein has low levels of lysine blockage with 6.9% blocked lysine and 9% reactive lysine.

b) The hydrolysed protein of step a) is combined with 1.52% by weight L-arginine, 0.3% by weight of L-tyrosine, and 0.3% by weight of L-histidine. The infant formula has the following composition:

| Component | Amount per 100 kcal |
|---|---|
| Protein | 1.9 g |
| Hydrolysed whey | 1.86 g |
| Free amino acids | 0.04 g |
| Lipids | 5.1 g |
| Palm olein | |
| Coconut oil | |
| Sunflower oil | |
| Canola oil | |
| Egg phospholipids | |
| Carbohydrates | 11.6 g |
| Lactose | 11.6 g |
| Vitamins and minerals | To meet regulations |

The infant formula is suitable for full term, hypoallergenic infants and has a balanced amino acid profile.

EXAMPLE 4

To compensate for the lesser quality of bovine milk proteins, infant formulae contain more protein than human milk. By improving the quality of the protein it is possible to use less protein. It has now been found that a formula containing modified sweet whey (having caseino-glyco-macropeptide removed) with about 1.83 g protein/100 kcal results in similar nitrogen retention as a conventional whey-enriched formula with 2.24 g protein/100 kcal. This has been tested by performing metabolic balance studies with 8 normal infants (2 girls, 6 boys, aged between 39 and 139 days) in a balanced cross-over design. A metabolic balance study (72 hours) was performed with each formula after a washout period of 11 days. The formula having 1.83 g protein/100 kcal contained modified sweet whey and casein and casein in a ratio of 70:30. The formula having 2.24 g protein/100 kcal contained demineralised whey and casein in a ratio of 60:40. In other respects the compositions were similar to commercially available infant formulae.

Results

|  | Nitrogen (mg/kg/d) | | | |
| --- | --- | --- | --- | --- |
|  | intake | Ur. Excr. | Fec. Excr. | Retent. |
| Formula having 1.83 g protein/ 100 kcal | 349 ± 83 | 194 ± 21 | 37 ± 15 | 117 ± 62 |
| Formula having 2.24 g protein/ 100 kcal | 284 ± 54 | 136 ± 25 | 31 ± 10 | 117 ± 63 |

The data show that adjustment of urinary nitrogen excretion enabled infants to maintain nitrogen retention at identical levels in spite of a substantial difference in intake. Absorption and retention of minerals and fat were similar with both formulae. It was concluded that a modified whey formula with protein-energy ratio 1.83 g/100 kcal leads to adequate nitrogen and mineral retention in normal infants. Lower urinary nitrogen excretion indicates reduced metabolic load. Commercially available infant formulae contain more protein (>2 g/100 kcal) than human milk; it is well established that plasma amino acids (AA) of formulae-fed infants deviate from breastfed infants. It has now been found that infants fed two formulae varying in amount and composition of protein (modified whey; 1.83 g protein/100 kcal; F-1.8 & F-1.8LCP) have AA closer to breast fed infants than infants a whey enriched formula (2.24 g protein/100 kcal; F-2.2). The 3 formulae were exclusively fed between 6 and 122 days of age. Blood was collected at 30, 61 and 122 days of age. Formula intake and the intervals between last feeding and blood sampling were recorded. AA (ion exchange; tryptophan: HPLC) were measured in plasma of breastfed infants (n=19) and infants fed formula F-1.8 (n=23), F-1.8LCP (n=20), F-2.2 (n=13). Statistical analysis was carried out by Kruskal-Wallis and Mann-Whitney tests. Levels of threonine, the branched chain AA, phenylalanine and lysine in the group fed F-2.2 were significantly higher than in the breastfed group. In the groups fed F-1.8 and F-1.8LCP threonine was close to the breastfed group and the branched-chain AA were not different from the breastfed group. Glycine concentrations win the groups F-1.8 and F-1.8LCP were higher than in the breastfed group. Since the time intervals between feeding and blood sampling did not differ among the groups, the dependence of citruline on protein load with formula (F-2.2, F-1.8, F1.8LCP) was found to be significant. The higher plasma urea values in the group F-2.2 are therefore due to increased synthesis and not decreased urinary urea excretion. It can be concluded that feeding modified whey formula with 1.8 g protein/100 kcal results in plasma amino acids at 30, 61 and 122 days of age which are close to breastfed infants.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A composition for an infant formula comprising a protein which has a low threonine content, the composition comprising:
   a whey component selected from the group consisting of acid whey protein and sweet whey protein from which caseino-glyco-macropeptide has been removed;
   free arginine;
   free histidine; and
   a component selected from the group consisting of free tyrosine, free tryptophan, tryptophan based milk protein and mixtures thereof, wherein the low threonine content comprises less than about 8 g threonine/16 g nitrogen.

2. A composition according to claim 1 which comprises from about 9.0 to about 10.0 w/w % of protein.

3. A composition according to claim 1, wherein the protein comprises casein protein.

4. A composition according to claim 3, wherein the protein comprises about 6% to about 50% by weight of whey protein and about 20% to about 40% casein protein.

5. A composition according to claim 1, wherein the whey component is substantially free of lactose, wherein the level of lysine blockage is less than 10% in said protein.

6. A composition according to claim 1, wherein the protein has less than 10% blocked lysine.

7. A composition according to claim 1, wherein the protein comprises hydrolyzed protein.

8. A composition according to claim 7, wherein the protein comprises about 98.5% to about 97% by weight of hydrolyzed sweet whey protein and about 1.5% to about 3% by weight of arginine, tyrosine, and histidine.

9. A composition according to claim 1 which comprises:
   about 0.1% to about 3% by weight of free arginine;
   about 0.2% to about 1% by weight of a component selected from the group consisting of free tryptophan and free tyrosine; and
   about 0.1% to about 1.5% by weight of histidine.

10. A composition according to claim 1 which comprises a lipid and a carbohydrate.

11. A composition according to claim 10, wherein the lipid comprises medium chain triglycerides.

12. A composition according to claim 10, wherein the carbohydrate includes lactose.

13. An infant formula comprising a protein having a low threonine content and comprising:
   a whey component selected from the group consisting of acid whey protein and sweet whey protein from which cascino-glyco-macropeptide has been removed;
   a component selected from the group consisting of free tyrosine, free tryptophan, tryptophan based milk protein and mixtures thereof;
   up to about 1.5% by weight histidine; and
   about 0.1% to about 2% by weight arginine, wherein the low threonine content comprises less than about 8 g threonine/16 g nitrogen.

14. An infant formula according to claim 13, wherein the protein source comprises about 0.2% to about 0.4% by weight histidine, about 1% to about 2% by weight arginine, and about 0.2% to about 0.4% by weight tryptophan.

15. An infant formula according to claim 13, wherein the protein source comprises about 1% to about 1.5% by weight histidine, about 0.6% to about 0.9% by weight arginine, and about 0.3% to about 0.5% by weight tyrosine.

16. An infant formula according to claim 13, wherein the protein source comprises about 0.2% to about 0.4% by weight histidine, about 1% to about 2% by weight arginine, and about 0.2% to about 0.4% by weight tyrosine.

17. A method of producing an infant formula composition comprising the steps of:

blending whey protein and casein protein together with free arginine, free histidine, and a component selected from the group consisting of free tyrosine, free tryptophan, tryptophan based milk protein and mixtures thereof, and homogenizing the blended mixture.

18. A method of providing a medicament to an infant comprising the step of administering to an infant a formula comprising:

a protein source which has a threonine content less than about 8 g threonine/16 g nitrogen and comprising a whey component selected from the group consisting of acid whey protein and sweet whey protein from which caseino-glyco-macropeptide has been removed, free arginine, free histidine, a component selected from the group consisting of free tyrosine, free tryptophan, tryptophan based milk protein and mixtures thereof, and a medicament.

19. A method of providing nutrition to an infant comprising the step of administering to an infant a formula comprising:

a protein source which has a threonine content less than about 8 g threonine/16 g nitrogen and comprising a whey component selected from the group consisting of acid whey protein and sweet whey protein from which caseino-glyco-macropeptide has been removed, free arginine, free histidine, a component selected from the group consisting of free tyrosine, free tryptophan, tryptophan based milk protein and mixtures thereof, and a nutritional agent.

20. An infant formula according to claim 13, wherein the protein source comprises up to about 0.1% by weight histidine, about 0.1% to about 0.3% by weight arginine, and about 0.3 to about 0.5% by weight tryptophan.

21. A method according to claim 17, wherein the whey component is substantially free of lactose, wherein the level of lysine blockage is less than 10% in said protein.

22. A method according to claim 17, wherein the infant formula comprises:

about 0.1% to about 3% by weight of arginine;

about 0.2% to about 1% by weight of a component selected from the group consisting of tryptophan and tyrosine; and about 0.1 to about 1.5% by weight of histidine.

23. A method according to claim 17, wherein the infant formula comprises a lipid and a carbohydrate.

24. A method according to claim 18, wherein the protein source comprises casein protein.

25. A method according to claim 18, wherein the whey component is substantially free of lactose, wherein the level of lysine blockage is less than 10% in said protein.

26. A method according to claim 18, wherein the protein source comprises:

about 0.1% to about 3% by weight of arginine;

about 0.2% to about 1% by weight of a component selected from the group consisting of tryptophan and tyrosine; and about 0.1% to about 1.5% by weight of histidine.

27. A method according to claim 18, wherein the formula comprises a lipid and a carbohydrate.

28. A method according to claim 19, wherein the protein source comprises casein protein.

29. A method according to claim 19, wherein the whey component is substantially free of lactose, wherein the level of lysine blockage is less than 10% in said protein.

30. A method according to claim 19, wherein the protein source comprises:

about 0.1% to about 3% by weight of arginine;

about 0.2% to about 1% by weight of a component selected from the group consisting of tryptophan and tyrosine; and about 0.1% to about 1.5% by weight of histidine.

31. A method according to claim 19, wherein the formula comprises a lipid and a carbohydrate.

32. A method according to claim 19, wherein the protein source comprises about 0.2% to about 0.4% by weight histidine, about 1% to about 2% by weight arginine, and about 0.2% to about 0.4% by weight tryptophan.

33. A method according to claim 19, wherein the protein source comprises about 1% to about 1.5% by weight histidine, about 0.6% to about 0.9% by weight arginine, and about 0.3% to about 0.5% by weight tyrosine.

34. A method according to claim 19, wherein the protein source comprises about 0.2% to about 0.4% by weight histidine, about 1% to about 2% by weight arginine, and about 0.2% to about 0.4% by weight tyrosine.

35. A method according to claim 19, wherein the protein source comprises up to about 0.1% by weight histidine, about 0.1% to about 0.3% by weight arginine, and about 0.3% to about 0.5% by weight tryptophan.

\* \* \* \* \*